United States Patent
Kumar et al.

(10) Patent No.: US 11,230,620 B2
(45) Date of Patent: Jan. 25, 2022

(54) THIOESTER-FUNCTIONAL ORGANIC POLYMERS, METHOD FOR PREPARING AND COMPOSITIONS THEREOF

(71) Applicant: Momentive Performance Materials Inc., Waterford, NY (US)

(72) Inventors: Vikram Kumar, Tarrytown, NY (US); Matthew Pinnow, Millwood, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 72 days.

(21) Appl. No.: 16/878,096

(22) Filed: May 19, 2020

(65) Prior Publication Data

US 2020/0369814 A1 Nov. 26, 2020

Related U.S. Application Data

(60) Provisional application No. 62/851,297, filed on May 22, 2019.

(51) Int. Cl.
| | | |
|---|---|---|
| *C08K 3/04* | (2006.01) | |
| *C08K 3/36* | (2006.01) | |
| *C08F 236/10* | (2006.01) | |

(52) U.S. Cl.
CPC .............. *C08F 236/10* (2013.01); *C08K 3/04* (2013.01); *C08K 3/36* (2013.01)

(58) Field of Classification Search
CPC ............ C08K 3/04; C08K 3/36; C08F 236/10

USPC .......................................................... 524/572
See application file for complete search history.

(56) References Cited

U.S. PATENT DOCUMENTS

| | | | |
|---|---|---|---|
| 7,250,479 B2* | 7/2007 | Le | .......................... C07F 9/4065 526/193 |
| 7,504,457 B2* | 3/2009 | Hogan | .................. B60C 1/0016 525/55 |
| 2020/0199258 A1* | 6/2020 | Hasebe | ..................... C08K 3/00 |

FOREIGN PATENT DOCUMENTS

| | | |
|---|---|---|
| WO | 199801478 A1 | 1/1998 |
| WO | 2006076629 A1 | 7/2006 |
| WO | 2018199267 A1 | 1/2018 |

OTHER PUBLICATIONS

International Search Report dated Sep. 16, 2020.

* cited by examiner

*Primary Examiner* — Kelechi C Egwim
(74) *Attorney, Agent, or Firm* — James C. Abruzzo

(57) ABSTRACT

An organic polymer comprising an organic polymer fragment and at least one S-alkylsilyl hydrocarbonthioate group or at least one S-alkylstannyl hydrocarbonthioate group bonded to the backbone of the organic polymer fragment through a C—Si covalent bond and their methods or production are provided. The organic polymer backbone can be derived from the anionic polymerization of monomers containing C—C unsaturation. The silicon or tin atom can be further bonded to two alkoxy groups, two hydrocarbon groups or to one alkoxy group and one hydrocarbon group.

28 Claims, No Drawings

THIOESTER-FUNCTIONAL ORGANIC POLYMERS, METHOD FOR PREPARING AND COMPOSITIONS THEREOF

CROSS REFERENCE TO RELATED APPLICATIONS

This application claims the benefit of and priority to provisional application Ser. No. 62/851,297, filed May 22, 2019, the entire contents of which are incorporated herein by reference.

FIELD OF THE INVENTION

This invention relates to the field of thioester-functional organic polymers, their methods of production and compositions made therefrom.

BACKGROUND OF THE INVENTION

Organic polymer compositions, especially organic rubber compositions containing one or more reinforcing materials, are often used in the preparation of consumer and industrial goods. Organic polymers may be converted into reinforced elastomers through a curing reaction. Tires, vibration damping pads, cushioning pad, shock absorbing pads, gaskets and other goods made from these cured organic polymers may be subjected to vibration, stress and strain during their use. When the cured organic polymers contain terminal polymer chain ends, the terminal polymer chain ends are often connected to the tie points of the cured organic polymer at only one end. The terminal polymer chain ends, often referred to as "dangling ends", contribute to undesirable hysteresis of the elastomer during use.

The hysteresis caused by the dangling ends of the cured organic polymer can result in heat build-up during use. Reinforced elastomers having high hysteresis may have poor long-term aging properties due to the elevated temperatures that can occur during use, which can contribute to polymer degradation and result in poor wear properties. Heat build-up and loss of energy are undesirable features for many applications. High hysteresis is particularly disadvantageous for tires, as it contributes to high rolling resistance. Minimization of rolling resistance of tires, on the other hand, improves automotive fuel efficiency.

One approach to reducing hysteresis of cured organic polymers is to provide for functionalized organic polymers. Organic polymers, which are terminated with reactive functional groups containing tin or silicon, are known. These functional groups are capable of reacting with each other to bond two terminal organic polymer chain ends together, thereby reducing the number of dangling ends. However, these reactive functional ends typically only react with each other and do not participate in the curing reaction.

Functionalized organic polymers, as for example, functionalized solution styrene butadienes have important commercial uses, such as for rubber compositions used in tire manufacture. Functionalized solution styrene butadiene copolymers have been used to improve rolling resistance and hysteresis, which impact fuel mileage properties of the tire. However, these polymers generally do not participate in the curing reactions, which may affect cured physical properties of the organic polymer and the compositions made therefrom.

Organic polymers containing terminal functional groups have been prepared by anionic polymerization of olefins, in which at the end of the polymerization, 2,2-dimethoxy-1-thia-silacyclopentane was added to form a terminal thiolalkylsilyl functional group, as described in U.S. Patent Publication No. 2012/0232223, the entirety of which is incorporated herein by reference. These polymers contain mercapto groups, which are reactive and may cause premature curing reactions during the preparation of rubber compositions based upon these organic polymers. Premature curing, commonly referred to as scorch, is undesirable because it makes the rubber composition harder to process and may generate premature crosslinked polymer waste.

Thioester functional polysiloxanes have been prepared as crosslinkers for organic rubber compositions. However, these thioester functional polysiloxanes are not a fully suitable replacement for organic polymers because their cured properties are generally inferior to organic polymer based compositions, especially in wear and handling properties of tires.

Accordingly, it is desirable to provide organic polymers and organic polymer compositions, including rubber compositions, which possess good scorch safety and reduced hysteresis, and methods of preparing those polymers.

SUMMARY OF THE INVENTION

In accordance with an aspect of the present invention, an organic polymer comprising an organic polymer fragment and at least one S-alkylsilyl hydrocarbonthioate group or at least one S-alkylstannyl hydrocarbonthioate group which is bonded to the backbone of the organic polymer fragment through a C—Si covalent bond and their methods of production are provided.

In an embodiment, the organic polymer comprising an organic polymer fragment and at least one S-alkylsilyl hydrocarbonthioate group or at least one S-alkylstannyl hydrocarbonthioate group which is bonded to the backbone of the organic polymer fragment through a C—Si covalent bond is an S-alkylsilyl hydrocarbonthioate-terminated organic polymers and S-alkylstannyl hydrocarbonthioate-terminated organic polymers and their methods of production are provided, where the organic polymer backbone is derived from the anionic polymerization of monomers containing C—C unsaturation and the silicon or tin atom is further bonded to two alkoxy groups, two hydrocarbon groups or to one alkoxy group and one hydrocarbon group.

In an embodiment, the S-alkylsilyl hydrocarbonthioate-terminated or S-alkylstannyl hydrocarbonthioate-terminated organic polymer has the general formula (I):

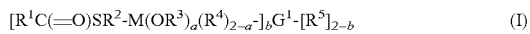

$$[R^1C(=O)SR^2\text{-}M(OR^3)_a(R^4)_{2-a}\text{-}]_b G^1\text{-}[R^5]_{2-b} \quad (I)$$

wherein
each M is independently a silicon or tin atom;
each $R^1$ is independently a monovalent alkyl, cycloalkyl, alkenyl, aryl or aralkyl group having 1 to 24 carbon atoms;
each $R^2$ is independently a divalent alkyl group of from 2 to 6 carbon atoms;
each $R^3$ is independently a monovalent alkyl, cycloalkyl, alkenyl, aryl or aralkyl group having 1 to 12 carbon atoms, or a monovalent group having the structure —$R^6(OR^7)_c(OR^8)_dR^9$, where $R^6$ is a divalent alkyl group having from 2 to 6 carbon atoms, $R^7$ is ethylene, each $R^8$ is independently propylene or butylene, $R^9$ is a monovalent alkyl, cycloalkyl, alkenyl, aryl or aralkyl group having 1 to 20 carbon atoms or —(C=O)$R^4$, and the subscripts c and d are integers, wherein c is from 0 to 6 and d is from 0 to 6, with the proviso that c+d is from 1 to 10;

each $R^4$ is independently methyl or phenyl;

$R^5$ is a monovalent alkyl, cycloalkyl, alkenyl, aryl or aralkyl group having 1 to 24 carbon atoms;

$G^1$ is an organic polymer fragment having a backbone of carbon atoms covalently bonded together by C—C single bond, C—C double bond or a combination of C—C single bonds and C—C double bonds; and the subscripts a and b are integers, where a is 0, 1 or 2 and b is 1 or 2.

A method for preparing the S-alkylsilyl hydrocarbonthioate-terminated or S-alkylstannyl hydrocarbonthioate-terminated organic polymer may comprise reacting C—C unsaturated carbon atoms with an anionic initiator to form a first anionic "living" polymer intermediate or a first "pseudo living" polymer intermediate, terminating the first anionic living polymer intermediate or first pseudo living polymer intermediate by reacting the first anionic living polymer intermediate or first pseudo living polymer intermediate with a compound containing a 2-thia-1-sila cycloalkane ring or a 2-thia-1-stanna cycloalkane ring to form a second intermediate containing at least one thiolate group and reacting the second intermediate containing at least one thiolate with an acyl reactive group having the general formula (II):

$$R^1C(\!\!=\!\!O)X \quad \quad \quad (II)$$

wherein $R^1$ is a monovalent alkyl, cycloalkyl, alkenyl, aryl or aralkyl group having 1 to 24 carbon atoms and X is chloride, bromide, iodide or a —$SR^{10}$, where $R^{10}$ is a monovalent alkyl, cycloalkyl, alkenyl, aryl or aralkyl group having 1 to 12 carbon atoms to form the reaction product, S-alkylsilyl hydrocarbonthioate-terminated or S-alkylstannyl hydrocarbonthioate-terminated organic polymer, and a salt. The salt may be removed from the crude reaction product.

Compositions comprising the S-alkylsilyl hydrocarbonthioate-terminated and/or S-alkylstannyl hydrocarbonthioate-terminated organic polymer can be formed by combining with other components, including reinforcing materials, curatives, plasticizers and additives.

DETAILED DESCRIPTION OF ILLUSTRATIVE EMBODIMENTS

In the specification and claims herein, the following terms and expressions are to be understood as having the hereinafter indicated meanings.

The singular forms "a," "an" and "the" include the plural.

Other than in the working examples or where otherwise indicated, all numbers expressing amounts of materials, reaction conditions, time durations, quantified properties of materials, and so forth, stated in the specification and claims are to be understood as modified by the term "about".

All methods described herein may be performed in any suitable order unless otherwise indicated or otherwise clearly excluded by context. The use of any and all examples or exemplary language (e.g., "such as" or "include") provided herein is intended merely to better illuminate the invention and does not limit the scope of the invention unless such is clearly intended to be the case.

No language in the specification should be construed as indicating any non-claimed element as essential to the practice of the invention.

As used herein, the terms "comprising," "including," "containing," "characterized by" and terms of like import are to be understood as inclusive or open-ended and as not excluding additional, unrecited elements or method steps; additionally, such terms are to be understood as including the more restrictive terms "consisting of" and "consisting essentially of."

Composition percentages are given in weight percent unless otherwise indicated.

It will be understood that a particular numerical value includes at least that value unless the context clearly indicates otherwise and that any range of numerical values includes all sub-ranges of values within that range and any combination of the various endpoints of such ranges or sub-ranges.

It will be further understood herein that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "S-alkylsilyl hydrocarbonthioate-terminated organic polymer" shall be understood herein to apply to any polymer containing one or more terminal and/or pendant thioester groups bonded to the organic polymer through a silicon atom.

The expression "S-alkylstannyl hydrocarbonthioate-terminated organic polymer" shall be understood herein to apply to any polymer containing one or more terminal and/or pendant thioester groups bonded to the organic polymer through a tin atom.

The term "polymer" as used herein shall be understood to be synonymous with "rubber" and vice versa.

The term "part per hundred rubber" or "phr" as used herein shall be understood to mean to the part by weight of the other component based on 100 parts by weight of the total weight of the S-alkylsilyl hydrocarbonthioate-terminated organic polymer(s) and S-alkylstannyl hydrocarbonthioate-terminated organic polymer(s).

As used herein, the term "monovalent" in reference to a group means that the group is capable of forming one covalent bond per group and "divalent" means that the group is capable of forming two covalent bonds per group. As used herein, the term "polyvalent" in reference to a group means that the group is capable of forming two or more covalent bonds per group.

As used herein, the term "hydrocarbon group" is a group consisting of carbon and hydrogen atoms and includes acyclic hydrocarbon groups, alicyclic hydrocarbon groups and aromatic hydrocarbon groups.

The term "heteroatom" means an element selected from oxygen, nitrogen, silicon, sulfur, phosphorus, fluorine, chlorine, bromine and iodine.

As used herein, the term "acyclic hydrocarbon group" means any straight chain or branched hydrocarbon group, preferably containing from 1 to about 24 carbon atoms, which may be saturated or unsaturated. Suitable monovalent acyclic hydrocarbon groups include alkyl, alkenyl and alkynyl groups. Representative and non-limiting examples of acyclic hydrocarbon groups are methyl, ethyl, sec-butyl, tert-butyl, octyl, decyl, dodecyl, cetyl, stearyl, ethenyl, propenyl, and butynyl.

As used herein the term "alkyl" means any saturated straight or branched hydrocarbon group. In a preferred embodiment, monovalent alkyl groups are selected from linear or branched alkyl groups containing from 1 to about 24 carbons per group such as, e.g., methyl, ethyl, propyl, iso-propyl, n-butyl, iso-butyl, sec-butyl, tert-butyl, pentyl, hexyl, heptyl, decyl and dodecyl. The term "monovalent alkyl" group means any saturated hydrocarbon group having one open valence, as for example —CH$_2$CH$_2$CH$_3$. The term "divalent alkyl" refers to a saturated straight or branched hydrocarbon group having two open valences, as for example —CH$_2$CH$_2$CH$_2$—. The term "polyvalent alkyl" means any saturated straight or branched hydrocarbon group having two or more open valences, as for example (—CH$_2$)$_2$CH—, where the number of open valences is three.

As used herein the term "cycloalkyl" means any alicyclic hydrocarbon group which does not contain unsaturation.

As used herein the term "alkenyl" means any straight or branched monovalent hydrocarbon group containing at least one carbon-carbon double bond and preferably containing from 2 to about 24 carbon atoms such as, e.g., ethenyl, 2-propenyl, 3-butenyl, 5-hexenyl and 7-octenyl.

As used herein, the term "alicyclic hydrocarbon group" means a group containing one or more hydrocarbon rings, preferably containing from 3 to 12 carbon atoms, which may optionally be substituted on one or more of the rings with one or more monovalent or divalent acyclic group containing preferably 1 to about 6 carbon atoms. In the case of an alicyclic hydrocarbon group containing two or more rings, the rings may be fused rings in which the two rings share two or more carbon atoms in common, or rings that are bonded to each other through a covalent bond or divalent acyclic group. Suitable monovalent alicyclic hydrocarbon groups include, e.g., cycloalkyl groups such as cyclohexyl and cyclooctyl or cycloalkenyl groups such as cyclohexenyl. Suitable divalent hydrocarbon groups include, e.g., saturated or unsaturated divalent monocyclic hydrocarbon groups such as, e.g., 1,4-cyclohexyl, where the numbers, 1 and 4, denote where the open valences are located on the cyclohexyl group. Divalent alicyclic hydrocarbons may also be referred to 1,4-cyclohexylene group.

As used herein, the term "aromatic hydrocarbon group" means a hydrocarbon group containing one or more aromatic rings, which may optionally be substituted on the aromatic rings with one or more monovalent or divalent acyclic groups preferably containing from 1 to about 6 carbon atoms. In the case of an aromatic hydrocarbon group containing two or more rings, the rings may be fused rings in which the rings share two or more carbon atoms in common, or rings that are bonded to each other through a covalent bond or divalent acyclic group. Suitable monovalent aromatic hydrocarbon groups include, e.g., phenyl, tolyl, naphthyl and anthryl as well as aralkyl groups such as 2-phenylethyl.

The invention is directed to an organic polymer comprising an organic polymer fragment and at least one S-alkylsilyl hydrocarbonthioate group or at least one S-alkylstannyl hydrocarbonthioate group bonded to the backbone of the organic polymer fragment through a C—Si covalent bond. In one embodiment of the invention, the S-alkylsilyl hydrocarbonthioate-terminated or S-alkylstannyl hydrocarbonthioate-terminated organic polymer has the general structure (I):

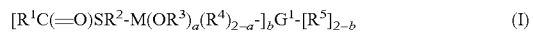

[R$^1$C(=O)SR$^2$-M(OR$^3$)$_a$(R$^4$)$_{2-a}$-]$_b$G$^1$-[R$^5$]$_{2-b}$  (I)

wherein
each M is independently a silicon or tin atom;
each R$^1$ is independently a monovalent alkyl, cycloalkyl, alkenyl, aryl or aralkyl group having 1 to 24 carbon atoms;
each R$^2$ is independently a divalent alkyl group of from 2 to 6 carbon atoms;
each R$^3$ is independently a monovalent alkyl, cycloalkyl, alkenyl, aryl or aralkyl group having 1 to 12 carbon atoms, or a monovalent group having the structure —R$^6$(OR$^7$)$_c$(OR$^8$)$_d$R$^9$, where R$^6$ is a divalent alkyl group having from 2 to 6 carbon atoms, R$^7$ is ethylene, each R$^8$ is independently propylene or butylene, R$^9$ is a monovalent alkyl, cycloalkyl, alkenyl, aryl or aralkyl group having 1 to 20 carbon atoms or —(C=O)R$^4$, and the subscripts c and d are integers, wherein c is from 0 to 6 and d is from 0 to 6, with the proviso that c+d is from 1 to 10;
each R$^4$ is independently methyl or phenyl;
R$^5$ is a monovalent alkyl, cycloalkyl, alkenyl, aryl or aralkyl group having 1 to 24 carbon atoms;
G$^1$ is an organic polymer fragment having a backbone of carbon atoms covalently bonded together by C—C single bond, C—C double bond or a combination of C—C single bonds and C—C double bonds; and
the subscripts a and b are integers, where a is 0, 1 or 2 and b is 1 or 2.

In another embodiment, G$^1$ is an organic polymer fragment having the general formula (III):

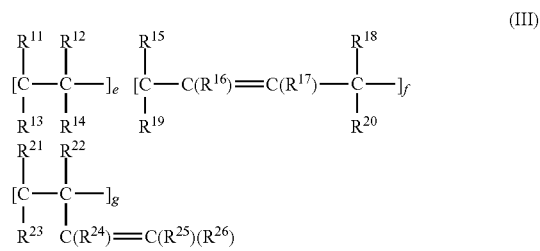

wherein
each R$^{11}$, R$^{12}$, R$^{13}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$ and R$^{26}$ is independently a monovalent alkyl group having from 1 to 6 carbon atoms or hydrogen;
each R$^{14}$ is independently hydrogen or a monovalent alkyl of from 1 to 24 carbon atoms, cylcoalkyl of from 3 to 24 carbon atoms, alkenyl of from 1 to 24 carbon atoms, cycloalkenyl of from 5 to 24 carbon atoms, aralkyl of from 7 to 24 carbon atoms or aryl group of from 6 to 25 carbon atoms;
the subscripts e, f and g are integers, where e is equal to or greater than 0, f is equal to or greater than 0 and g is equal to or greater than 0, with the proviso that e+f+g is equal to or greater than 1.

In another embodiment, e is preferably from 0 to 10,000, even more preferably from 0 to 5,000, still more preferably from 0 to 1,000 and yet still more preferably from 100 to 2,500; f is more preferably from 0 to 10,000, even more preferably from 0 to 5,000, still more preferably from 0 to 1,000 and yet still more preferably from 100 to 2,500; and g is more preferably from 0 to 10,000, even more preferably from 0 to 5,000, still more preferably from 0 to 1,000 and yet still more preferably from 100 to 2,500, with the proviso that e+f+g is from 1 to 10,000, more preferably from 100 to 7,500, even more preferably from 1,000 to 5,000 and even more preferably from 1,500 to 2,500.

In still another embodiment, each R$^{11}$, R$^{12}$, R$^{13}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$ and R$^{26}$ is more preferably hydrogen, methyl or ethyl, even more preferably hydrogen or methyl and still more preferably hydrogen.

In yet another embodiment, R$^{14}$ is hydrogen, a monovalent linear or branched alkyl group having from 1 to 24 carbon atom, a monovalent cycloalkyl group having from 3 to 24 carbon atoms, including monocycloalkyl, bicycloalkyl or polycycloalkyl, an alkenyl group having from 3 to 24 carbon atoms, more preferably from 4 to 16 carbon atoms and still more preferably 6 to 10, a cyloalkenyl having from 5 to 24 carbon atoms, more preferably from 6 to 18 carbon atoms and still more preferably from 7 to 10 carbon atoms, aralkyl of from 7 to 12 carbon atoms and more preferably from 8 to 10, or an aryl of from 6 to 12 carbon atoms and more preferably from 6 to 8 carbon atoms.

Representative and non-limiting examples of $R^{14}$ include hydrogen, methyl, ethyl, propyl, butyl, pentyl, octyl, decyl, heptadecyl, octadecyl, 2-methylpropyl, 3-methyl butyl, 2-ethylhexyl, cyclohexyl, cyclodecyl, adamantyl, norbornyl, phenyl, tolyl, xylyl, 2-phenylethyl, 2-methylpropenyl, 4-methylhex-4-enyl, hex-3-enyl, adamantenyl and norbornenyl.

In yet still another embodiment, $R^1$ is a monovalent straight chain alkyl group of from 1 to 18 carbon atoms, more preferably from 2 to 14 carbon atoms and even more preferably from 5 to 9 carbon atoms, a monovalent branched chain alkyl group of from 3 to 18 carbon atoms and more preferably from 5 to 11 carbon atoms, or phenyl.

Representative and non-limiting examples of $R^1$ are methyl, ethyl, propyl, pentyl, hexyl, heptyl, nonyl, unidecyl, octadecyl, dec-3-enyl, heptadec-5-enyl, heptadec-5,7-dienyl, heptadec-5,7,9-trienyl, 2-methylpenyl, 2-methylhexyl, 6-methylheptyl, 2-phenylmethyl, cyclohexyl, phenyl or tolyl.

In still yet another embodiment, $R^2$ is a divalent straight chain alkyl group of from 1 to 6 carbon atoms or a divalent branched chain alkyl group of from 3 to 6 carbon atoms.

Representative and non-limiting examples of $R^2$ include divalent groups selected from methyl, ethyl, propyl, 2-methylpropyl, 2,2-dimethylbutyl and hexyl.

In still another embodiment, $R^3$ is, a monovalent alkyl group of from 1 to 4 carbon atoms or $—R^6(OR^7)_c(OR^8)_dR^9$, where $R^6$ is a divalent alkyl group having from 2 to 4 carbon atoms, $R^7$ is ethylene, $R^8$ is propylene and $R^9$ is a monovalent straight chain or branched chain alkyl group of from 1 to 18 carbon atoms and more preferably a monovalent group of from 6 to 16.

In yet another embodiment, $R^4$ is methyl.

In still yet another embodiment, $R^2$ is divalent propyl, $R^3$ is methyl, a is 2 and b is 2.

In an embodiment, $G^1$ is an organic fragment having formula (II), wherein $R^{15}$, $R^{16}$, $R^{17}$, $R^{18}$, $R^{19}$, $R^{20}$, $R^{21}$, $R^{22}$, $R^{23}$, $R^{24}$, $R^{25}$ and $R^{26}$ are hydrogen, and e is 0, and the molar ratio of f:g is from 0:100 to 100:0, more preferably from about 10:90 to about 90:10, and even more preferably from about 25:75 to about 75:25.

In still another embodiment, $R^{11}$, $R^{12}$, $R^{13}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ and $R^{26}$ is hydrogen, $R^{14}$ is phenyl and the molar ratio of e:g is from 1:99 to 60:40, more preferably from about 20:80 to about 50:50, and even more preferably from about 35:65 to about 45:55.

In yet still another embodiment, the S-alkylsilyl hydrocarbonthioate-terminated terminated organic polymer has the general formula (IV):

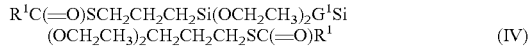

$$R^1C(=O)SCH_2CH_2CH_2Si(OCH_2CH_3)_2G^1Si(OCH_2CH_3)_2CH_2CH_2CH_2SC(=O)R^1 \quad (IV)$$

where $R^1$ is a monovalent straight chain alkyl group having from 1 to 18 carbon atoms, more preferably 5 to 11 carbon atoms and $G^1$ has any of the definitions from above.

The number average molecular weight (Mn) of the S-alkylsilyl hydrocarbonthioate-terminated organic polymers or S-alkylstannyl hydrocarbonthioate-terminated organic polymers made according to anionic polymerization techniques is from about 2,000 to about 1,000,000 Daltons, more specifically from about 50,000 to about 500,000 Daltons, even more preferably from about 75,000 to about 250,000 Daltons or still even more preferably from about 90,000 to about 150,000 Daltons.

The number average molecular weight is determined in according to ASTM D6474-12 Standard Test Methods for Determining Molecular Weight Distribution and Molecular Weight Average of Polyolefins by High Temperature Gel Permeation Chromatography.

The S-alkylsilyl hydrocarbonthioate-terminated organic polymers or S-alkylstannyl hydrocarbonthioate-terminated organic polymers are prepared from anionic polymerization of a single monomer or mixture of monomers containing C—C unsaturation, including olefins, vinyl aromatics and polyenes. When mixtures of monomers containing C—C unsaturation are used, the polymerization can result in a polymer chain which has random distribution of mers (repeating units), or block distribution of mers or a combination of random and block distributions.

Representative and non-limiting examples of monomers include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene; olefins, particularly ethylene, propylene, 1-hexene, 1-octene, 1-octadecene, vinyl norborene and vinyl adamantene; and vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, the mer units with pendent aromatic groups can constitute in an embodiment from about 1 to about 50 weight percent, more preferably from about 10 to about 45 weight percent or even more preferably from about 20 to about 35 weight percent, of the polymer chain.

The S-alkylsilyl hydrocarbonthioate-terminated organic polymers or S-alkylstannyl hydrocarbonthioate-terminated organic polymers can incorporate the polyene into the polymer chains by a 1,2-microstructure, which results from only one of the C—C double bonds participating in the polymerization or a 1,4-microstructure, in which two conjugated carbon-carbon double bonds are involved in the polymerization reaction become incorporated at 1,4 positions with the generation of a new carbon-carbon double bond. The polymer chain of the 5-alkylsilyl hydrocarbonthioate-terminated organic polymers or S-alkylstannyl hydrocarbonthioate-terminated organic polymers can contain the mers derived from polyene and resulting in a 1,2-microstructure, based on molar percentage of the total molar amounts of polyene derived mers, of preferably from about 10 to about 80 molar percent, more preferably from about 25 to about 65 molar percent, and even more preferably, not more than 50 molar percent. In certain use applications, the content of the 1,2-microstructure is even lower, including less than about 7 molar percent, or even less than about 1 molar percent, as resulting from the polymer fragment based upon polyisoprene.

The S-alkylsilyl hydrocarbonthioate-terminated organic polymers or S-alkylstannyl hydrocarbonthioate-terminated organic polymers can be homopolymers, such as for example butadiene and polyisoprene polymers, or copolymers, such as for example, styrene/butadiene copolymer.

The S-alkylsilyl hydrocarbonthioate-terminated organic polymers or S-alkylstannyl hydrocarbonthioate-terminated organic polymers may have a gum Mooney viscosity (ML$_4$/100° C.) of preferably from about -2 to about -150, more preferably from about 2.5 to about 125 and even more preferably, from about 10 to about 75. The Mooney viscosity can be measured in accordance with ASTM D1646-17, Standard Test Methods for Rubber—Viscosity, Stress Relaxation, and pre-Vulcanization Characteristics (Mooney Viscometer).

The foregoing types of polymers can be made by emulsion polymerization or solution polymerization, with the latter affording greater control with respect to such properties as randomness, microstructure, etc. Depending on the nature of the polymer desired, the particular conditions of the solution polymerization can vary significantly. The solution polymerization may involve an initiator. The initiator may be an organolithium compound or a functionalized initiator. The methods for producing the polymers are described, for example, in U.S. Patent Publication No. 2012/0232223 A1, the entirety of which is incorporated herein by reference.

Representative and non-limiting examples of organolithium initiators include mono-functional lithium salts, multi-functional lithium salts and functionalized initiators.

Mono-functional lithium salts include lithium salts of hydrocarbon carbanions of from 1 to 12 carbon atoms, such as n-butyllithium or n-hexyllithium.

Multifunctional initiators, which are capable of forming polymers with more than one living end, can be used. The multifunctional initiators include divalent lithium salts of hydrocarbon carbanions containing from 1 to 24 carbon atoms. Representative and non-limiting examples of multifunctional initiators include 1,4-dilithiobutane, 1,10-dilithiodecane, 1,20-dilithioeicosane, 1,4-dilithiobenzene, 1,4-dilithionaphthalene, 1,10-dilithioanthracene and 1,2-dilithio-1,2-diphenylethane.

In addition to organolithium initiators, functionalized initiators also can be useful. These become incorporated into the polymer chain, thus providing a functional group at the initiated end of the chain. Examples of such materials include lithiated aryl thioacetals as disclosed in U.S. Pat. No. 7,153,919 and U.S. Patent Publication 2012/0232223 A1, incorporated each by reference herein in its entirety, and the reaction products of organolithium compounds and N-containing organic compounds such as substituted aldimines, ketimines, secondary amines, etc., optionally pre-reacted with a compound such as diisopropenyl benzene, as disclosed in U.S. Pat. Nos. 5,153,159 and 5,567,815 and U.S. Patent Publication 2012/0232223 A1, each incorporated herein by reference in its entirety.

Representative and non-limiting examples include lithium salts of imine, such as N-lithio-hexamethyleneimine; lithium salts of trialkyl tin having alkyl groups of from 1 to 12 carbon atoms, such as tributyltin lithium; and lithium salts of dialkylamines having alkyl groups of from 1 to 12 carbon atoms, such as dimethylaminolithium, diethylaminolithium, dipropylaminolithium and dibutylaminolithium.

In preparing the S-alkylsilyl hydrocarbonthioate-terminated organic polymers or S-alkylstannyl hydrocarbonthioate-terminated organic polymers, the reaction can be carried out in a solvent. Useful anionic polymerization solvents include various $C_5$-$C_{12}$ cyclic and acyclic alkanes as well as their alkylated derivatives, certain liquid aromatic compounds, and mixtures thereof.

In solution polymerizations, both randomization and vinyl content resulting from 1,2-microstructure can be increased through inclusion of a coordinator, usually a polar compound, as one of the polymerization ingredients. Up to 90 or more equivalents of coordinator can be used per equivalent of initiator, with the amount depending on the amount of vinyl content desired, the level of non-polyene monomer employed, the reaction temperature, and nature of the specific coordinator employed. Compounds useful as coordinators include organic compounds that include a heteroatom having a non-bonded pair of electrons, especially oxygen or nitrogen.

Representative and non-limiting examples of coordinators include ethers, such as diethyl ether, dialkyl ethers of mono- and oligo-alkylene glycols; crown ethers; tertiary amines such as tributylamine, tetramethylethylene diamine, N,N'-dimethylpiperazine and diazabicyclooctane; tetrahydrofuran; tetrahydro furan oligomers; 2,2-bis(2'-tetrahydro-furyl)propane; linear and cyclic oligomeric oxolanyl alkanes, as disclosed in U.S. Pat. No. 4,429,091, incorporated herein by reference in its entirety; and phosphoramides, such as hexamethylphosphoramide.

The process for preparing the S-alkylsilyl hydrocarbonthioate-terminated organic polymers or S-alkylstannyl hydrocarbonthioate-terminated organic polymers can be carried out in a batch, semi-continuous or continuous process.

Solution anionic polymerization typically begins by charging the monomer or a blend of monomers and solvent(s) to a suitable reaction vessel, followed by addition of a coordinator (if used) and initiator, which often are added as part of a solution or blend. Alternatively, the monomer(s) and coordinator(s) can be added to the initiator. The procedure typically is carried out under anhydrous, anaerobic conditions. The reactants can be heated to a temperature of up to about 150° C., more preferably from 20° C. to 125° C. and agitated. After a desired degree of conversion has been reached, the heat source (if used) can be removed, and the reaction mixture is removed to a post-polymerization vessel for functionalization and/or quenching. At this point, the reaction mixture commonly is referred to as a "polymer cement" because of its relatively high concentration of polymer.

Certain end use applications call for polymers that have properties that can be difficult or inefficient to achieve via anionic (living) polymerizations. For example, in some applications, conjugated diene polymers having high cis-1,4-linkage contents can be desirable. The intermediate organic polymer can be prepared by processes using polyene and catalysts, as opposed to the initiators employed in living polymerizations, and the process may display pseudo-living characteristics.

Some catalyst systems preferentially result in cis-1,4-polydienes, while others preferentially provide trans-1,4-polydienes. Suitable catalyst systems can employ lanthanide metals which are known to be useful for polymerizing conjugated diene monomers. Preferably, catalyst systems that include a lanthanide compound can be used to provide cis-1,4-polydienes from one or more types of conjugated dienes. Preferred lanthanide-based catalyst compositions are disclosed in U.S. Pat. No. 6,699,813 and U.S. Patent Publication 2012/0232223 A1, each incorporated herein by reference in its entirety. The term "catalyst composition" is intended to encompass a simple mixture of ingredients, a complex of various ingredients that is caused by physical or chemical forces of attraction, a chemical reaction product of some or all of the ingredients, or a combination of the foregoing.

Exemplary lanthanide catalyst compositions include (a) a lanthanide compound, an alkylating agent and a halogen-containing compound, although use of a halogen-containing compound is optional when the lanthanide compound or the alkylating agent contains a halogen atom; (b) a lanthanide compound and an aluminoxane; or (c) a lanthanide compound, an alkylating agent, and a non-coordinating anion or precursor thereof.

Various lanthanide compounds or mixtures thereof can be employed. These compounds preferably are soluble in hydrocarbon solvents such as aromatic hydrocarbons, including benzene, toluene, xylenes, ethylbenzene, mesitylene, and the like; aliphatic hydrocarbons such as linear and branched $C_5$-$C_{10}$ alkanes, petroleum ether, kerosene, petroleum spirits, and the like; or cycloaliphatic hydrocarbons such as cyclopentane, cyclohexane, methylcyclopentane, methylcyclohexane, and the like. Hydrocarbon-insoluble lanthanide compounds can be suspended in the polymerization medium. Specific lanthanide compounds include those which include at least one Nd, La, or Sm atom or those including didymium, a commercial mixture of rare-earth elements obtained from monazite sand. The lanthanide atom(s) in the lanthanide compounds can be in any of a number of oxidation states, although compounds having a lanthanide atom in the +3 oxidation state typically are employed.

Exemplary lanthanide compounds include lanthanide carboxylates, lanthanide organophosphates, lanthanide organophosphonates, lanthanide organophosphinates, lanthanide xanthates, lanthanide carbamates, lanthanide dithiocarbamates, lanthanide β-diketonates, lanthanide alkoxides, lanthanide aryloxides, lanthanide halides, lanthanide pseudo-halides, lanthanide oxyhalides, and the like; numerous examples of each of these types of lanthanide compounds can be found in the U.S. Pat. No. 6,699,813, incorporated herein by reference in its entirety.

The lanthanide compound is used typically in conjunction with one or more alkylating agents, as for example, organometallic compounds that can transfer hydrocarbyl groups to another metal. Typically, these agents are organometallic compounds of electropositive metals such as Groups 1, 2, and 3 metals.

Exemplary alkylating agents include organoaluminum compounds such as those having the general formula (V):

$$AlR^{27}_nX_{3-n} \quad (V)$$

where n is an integer of from 1 to 3 inclusive; each $R^{27}$ independently is a monovalent organic group, which may contain heteroatoms such as nitrogen, oxygen, boron, silicon, sulfur or phosphorus connected to the aluminum atom through a C atom, and each X independently is a hydrogen atom, a halogen atom, a carboxylate group, an alkoxide group or an aryloxide group; and oligomeric linear or cyclic aluminoxanes, which can be made by reacting trihydrocarbylaluminum compounds with water, as well as organomagnesium compounds such as those having the general formula (VI):

$$R^{28}_mMgX_{2-m} \quad (VI)$$

where X is defined as above, m is 1 or 2, and $R^{28}$ is $R^{27}$, where each monovalent organic group is connected to the magnesium atom through a carbon atom. Some catalyst compositions can contain compounds with one or more labile halogen atoms.

Preferably, the halogen-containing compounds are soluble in hydrocarbon solvents such as those described above with respect to lanthanide compounds, although hydrocarbon-insoluble compounds can be suspended in the polymerization medium. Useful halogen-containing compounds include elemental halogens, mixed halogens, hydrogen halides, organic halides, inorganic halides, metallic halides, organometallic halides, and mixtures of any two or more of the foregoing.

Other catalyst compositions contain a non-coordinating anion or a non-coordinating anion precursor. Exemplary non-coordinating anions include tetraarylborate anions, particularly fluorinated tetraarylborate anions. Exemplary non-coordinating anion precursors include boron compounds that include strong electron-withdrawing groups.

Catalyst compositions of the type just described have very high catalytic activity for polymerizing conjugated dienes into stereospecific polymers having multiple carbon-carbon double bonds over a wide range of concentrations and ratios, although polymers having the most desirable properties typically are obtained from systems that employ a relatively narrow range of concentrations and ratios of ingredients. Further, the catalyst ingredients are believed to interact to form an active catalyst species, so the optimum concentration for each ingredient can depend on the concentrations of the other ingredients. The molar ratios are exemplary for a variety of different systems based on the foregoing ingredients: alkylating agent to lanthanide compound, where the alkylating agent/Ln ratio is preferably from about 1:1 to about 200:1, more preferably from about 2:1 to about 100:1 and even more preferably from about 5:1 to about 50:1; halogen-containing compound to lanthanide compound, where halogen atom/Ln ratio is from about 1:2 to about 20:1, more preferably from about 1:1 to about 10:1 and even more preferably from about 2:1 to about 6:1; aluminoxane to lanthanide compound, preferably equivalents of aluminum atoms on the aluminoxane to equivalents of lanthanide atoms in the lanthanide compound, where the molar ratio of Al/Ln is from about 50:1 to about 50,000:1, more preferably from about 75:1 to about 30,000:1 and even more preferably from about 100:1 to about 1,000:1; and non-coordinating anion or precursor to lanthanide compound, where the molar ratio An/Ln is preferably from about 1:2 to about 20:1, more preferably from about 3:4 to about 10:1 and even more preferably from about 1:1 to about 6:1.

The molecular weight of the organic polymer intermediate produced with lanthanide-based catalysts can be controlled by adjusting the amount of catalyst used and/or the amounts of co-catalyst concentrations within the catalyst system. The intermediate can be produced having a wide range of molecular weights. In general, increasing the catalyst and co-catalyst concentrations reduces the molecular weight of resulting intermediate, although very low molecular weight intermediates require extremely high catalyst concentrations. Typically, this necessitates removal of catalyst residues from the polymer to avoid adverse effects such as retardation of the sulfur cure rate. U.S. Pat. No. 6,699,813, incorporated herein by reference in its entirety, teaches that nickel compounds can be used as very efficient molecular weight regulators. Including one or more nickel-containing compounds to lanthanide-based catalyst compositions permits easy regulation of the molecular weight of the resulting intermediate without significant negative effects on catalyst activity and polymer microstructure.

Various nickel-containing compounds or mixtures thereof can be employed. The nickel-containing compounds can be soluble in hydrocarbon solvents, although hydrocarbon-insoluble nickel-containing compounds can be suspended in the polymerization medium to form the catalytically active species.

The nickel atom in the nickel-containing compounds can be in any of a number of oxidation states including the 0, +2, +3, and +4 oxidation states, although divalent nickel compounds, where the Ni atom is in the +2 oxidation state, generally are preferred. Exemplary nickel-compounds include nickel carboxylates, nickel organophosphates, nickel organophosphonates, nickel organophosphinates, nickel xanthates, nickel carbamates, nickel dithiocarbamates, nickel β-diketonates, nickel alkoxides, nickel aryloxides, nickel halides, nickel pseudo-halides, nickel oxyhalides, organonickel compounds, where the compounds containing at least one C—Ni bond, such as, for example, nickelocene, decamethylnickelocene, and the like.

The molar ratio of the nickel-containing compound to the lanthanide compound (Ni/Ln) generally ranges preferably from about 1:1000 to about 1:1, more preferably from about 1:200 to about 1:2, and even more preferably from about 1:100 to about 1:5.

These types of catalyst compositions can be formed using various methods, including an in situ method, a pre-mixed method, a pre-formed method, or a two-stage method. The in situ method comprises adding the catalyst ingredients to the monomer or a solution containing the monomer and solvent. The addition can occur in a stepwise or simultaneous manner. In the case of the latter, the alkylating agent preferably is added first, followed by, in order, the lanthanide compound, the nickel-containing compound (if used), and the halogen-containing compound (if used) or the non-coordinating anion or non-coordinating anion precursor. The pre-mixed method comprises mixing the ingredients outside the polymerization system, generally at a temperature of from about −20° C. to about 80° C., before being introduced to the conjugated diene monomer(s) or the catalyst ingredients are mixed in the presence of a small amount of conjugated diene monomer(s) at a temperature of from about −20° C. to about 80° C., where the amount of conjugated diene monomer can range from about 1 to about 500 moles, more preferably from about 5 to about 250 moles, and even more preferably from about 10 to about 100 moles, per mole of the lanthanide compound, and where the resulting catalyst composition is added to the remainder of the conjugated diene monomer(s) to be polymerized. The two-stage method comprises combining the alkylating agent with the lanthanide compound in the absence of conjugated diene monomer, or in the presence of a small amount of conjugated diene monomer, at a temperature of from about −20° C. to ~80° C. The foregoing mixture and the remaining components are then charged in either a stepwise or simultaneous manner to the remainder of the conjugated diene monomer(s) to be polymerized. The nickel-containing compound, if used, can be included in either stage. When a solution of one or more of the catalyst ingredients is prepared outside the polymerization system in the foregoing methods, an organic solvent or carrier is preferably employed. Useful organic solvents include those mentioned previously.

The production of the intermediate containing a cis-1,4-microstructure carbon-carbon double bond is accomplished by polymerizing conjugated diene monomer(s) in the presence of a catalytically effective amount of a catalyst composition. The total catalyst concentration to be employed in the polymerization mass depends on the interplay of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges preferably from about 0.01 millimole to about 2 millimoles, more preferably from about 0.02 millimole to about 1 millimole, and even more preferably from about 0.05 millimole to about 0.5 millimole per 100 grams of the conjugated diene monomer. All other ingredients generally are added in amounts that are based on the amount of lanthanide compound.

Polymerization is preferably carried out in an organic solvent as a solution or suspension where the monomer is in a condensed phase. The catalyst ingredients preferably are solubilized or suspended within the organic liquid. The concentration of monomer present in the polymerization medium at the beginning of the polymerization generally ranges from about 3 to about 80 weight percent, more preferably from about 5 to about 50 weight percent, and even more preferably from about 10 to about 30 weight percent, based on the weight of the polymerization medium. Polymerization also can be carried out by means of bulk polymerization conducted either in a condensed liquid phase or in a gas phase.

The polymerization preferably is conducted with moderate to vigorous agitation under anaerobic conditions provided by an inert protective gas such as nitrogen, argon or helium. The polymerization temperature may vary widely, although typically a temperature of from about 20° C. to about 90° C. is employed. The heat of the reaction can be removed by external cooling or cooling by evaporation of the monomer or the solvent. The polymerization pressure employed may vary widely, although typically a pressure of from about 0.1 to about 1 MPa is employed.

When 1,3-butadiene is polymerized in a coordination catalyst system, the cis-1,4-polybutadiene generally has a number average molecular weight, as determined by GPC using polystyrene standards, of from about 2,000 to about 200,000 Daltons, more preferably from about 25,000 to about 150,000 Daltons, and even more preferably from about 50,000 to about 120,000 Daltons. The polydispersity of the polymers generally ranges from about 1.5 to about 5.0, and more typically from about 2.0 to about 4.0. The intermediate advantageously can have a cis-1,4-miccrostructure (linkage) content of at least about 60 mole percent, more preferably at least about 75%, even more preferably at least about 90 mole percent, and still even more preferably at least about 95 mole percent, and a 1,2-microstructure (linkage) content of less than about 7 mole percent, more preferably less than about 5 mole percent, still more preferably less than about 2 mole percent and yet still even less than about 1 mole percent.

Both of the described polymerization processes advantageously result in polymer chains that possess reactive (living or pseudo-living) terminals, which can be further reacted with one or more functionalizing agents so as to provide functionalized polymers. The functionalization can enhance the interaction between the polymer and particulate fillers in rubber compounds, thereby improving the mechanical and dynamic properties of the resulting vulcanizates.

The S-alkylsilyl hydrocarbonthioate-terminated organic polymer or S-alkylstannyl hydrocarbonthioate-terminated organic polymers polymer can be provided by reacting a terminally active polymer with a compound comprising a 2-thia-1-sila cycloalkane ring or a 2-thia-1-stanna cycloalkane ring to form a second intermediate containing at least one thiolate group and reacting the second intermediate containing at least one thiolate with an acyl reactive compound. The 2-thia-1-sila cycloalkane ring or a 2-thia-1-stanna cycloalkane includes in its ring structure at least one S atom and at least one Si or Sn atom. The ring structure may contain a divalent linear alkyl group having from 2 to 6 carbon atoms, preferably 3 to 5 carbon atoms and most preferably 3 carbon atoms, a sulfur atom and a silicon atom or tin atom. The compound comprising a 2-thia-1-sila cycloalkane ring or a 2-thia-1-stanna cycloalkane ring can have the formula (VII):

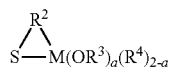

(VII)

wherein
   each M is independently a silicon or tin atom;
   each $R^2$ is independently a divalent alkyl group of from 2 to 6 carbon atoms;
   each $R^3$ is independently a monovalent alkyl, cycloalkyl, alkenyl, aryl or aralkyl group having 1 to 12 carbon atoms, or a monovalent group having the structure $-R^6(OR^7)_c(OR^8)_dR^9$, where $R^5$ is a divalent alkyl group having from 2 to 6 carbon atoms, $R^7$ is ethylene, each $R^8$ is independently propylene or butylene, $R^9$ is a monovalent alkyl, cycloalkyl, alkenyl, aryl or aralkyl group having 1 to 20 carbon atoms or $-(C=O)R^4$, and the subscripts c and d are integers, wherein c is from 0 to 6 and d is from 0 to 6, with the proviso that c+d is from 1 to 10;
   each $R^4$ is independently methyl or phenyl; and
   the subscript a is an integer, where a is 0, 1 or 2.

The compounds of formula (VIII) can be prepared from a mercapto-functional alkylalkoxysilane having the general formula (VIII):

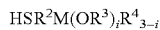

wherein
   each M is independently a silicon or tin atom;
   each $R^2$ is independently a divalent alkyl group of from 2 to 6 carbon atoms;
   each $R^3$ is independently a monovalent alkyl, cycloalkyl, alkenyl, aryl or aralkyl group having 1 to 12 carbon atoms, or a monovalent group having the structure $-R^6(OR^7)_c(OR^8)_dR^9$, where $R^5$ is a divalent alkyl group having from 2 to 6 carbon atoms, $R^7$ is ethylene, each $R^8$ is independently propylene or butylene, $R^9$ is a monovalent alkyl, cycloalkyl, alkenyl, aryl or aralkyl group having 1 to 20 carbon atoms or $-(C=O)R^4$, and the subscripts c and d are integers, wherein c is from 0 to 6 and d is from 0 to 6, with the proviso that c+d is from 1 to 10;
   each $R^4$ is independently methyl or phenyl; and
   the subscript i is an integer, where i is 1, 2 or 3.

The compounds of formula (VII) can be prepared by reacting the mercapto-functional alkylalkoxysilane in the presence of a strong base, at a temperature of from 15° C. to 230° C. and pressure of 1 millibar to 2 bar and more preferably at a temperature of from 50° C. to 200° C. and pressure of 1 millibar to 500 millibar.

The strong base is preferably an alkali metal alkoxide salt having the general formula (IX):

$$M^1OR^3 \quad (IX)$$

wherein $R^3$ is a monovalent alkyl, cycloalkyl, alkenyl, aryl or aralkyl group having 1 to 12 carbon atoms, or a monovalent group having the structure $-R^6(OR^7)_c(OR^8)_dR^9$, where $R^5$ is a divalent alkyl group having from 2 to 6 carbon atoms, $R^7$ is ethylene, each $R^8$ is independently propylene or butylene, $R^9$ is a monovalent alkyl, cycloalkyl, alkenyl, aryl or aralkyl group having 1 to 20 carbon atoms or $-(C=O)R^4$, and the subscripts c and d are integers, wherein c is from 0 to 6 and d is from 0 to 6, with the proviso that c+d is from 1 to 10; and $M^1$ is lithium, sodium or potassium.

Other strong bases may also be used, including alkali metals, such as lithium, sodium or potassium and alkali metal hydrides, such as sodium hydride.

One method for preparing the S-alkylsilyl hydrocarbonthioate-terminated or S-alkylstannyl hydrocarbonthioate-terminated organic polymer comprises reacting C—C unsaturated carbon atoms with an anionic initiator to form a first anionic living or pseudo living polymer intermediate, terminating the living anionic or pseudo living polymer by reacting the first anionic living polymer intermediate or pseudo living polymer intermediate with a compound containing a 2-thia-1-sila cycloalkane ring or the 2-thia-1-stanna cycloalkane ring to form a second intermediate containing at least one thiolate group. The reaction can be carried out at a temperature of from about −20° C. to about 125° C., more preferably from about 20° C. to about 95° C. and still more preferably, from about 40° C. to about 75° C., and pressure of about 1 millibar to about 2 bar, more preferably from about 100 millibar to about 1.1 bar and still more preferably from about 500 millibar to 1 bar. The reaction can be carried out in the presence of a solvent.

The second intermediate containing at least one thiolate group can be then reacted with an acyl reactive group having the general formula (II):

$$R^1C(=O)X \quad (II)$$

wherein $R^1$ is a monovalent alkyl, cycloalkyl, alkenyl, aryl or aralkyl group having 1 to 24 carbon atoms and X is chloride, bromide, iodide or a $-SR^{10}$, where $R^{10}$ is a monovalent alkyl, cycloalkyl, alkenyl, aryl or aralkyl group having 1 to 12 carbon atoms to form the reaction product, S-alkylsilyl hydrocarbonthioate-terminated or S-alkylstannyl hydrocarbonthioate-terminated organic polymer, and a salt. The salt may be removed from the crude reaction product. The reaction can be carried out at a temperature of from about −20° C. to about 125° C., more preferably from about 20° C. to about 95° C. and still more preferably, from about 40° C. to about 75° C., and pressure of about 1 millibar to about 2 bar, more preferably from about 100 millibar to about 1.1 bar and still more preferably from about 500 millibar to 1 bar. The reaction can be carried out in the presence of a solvent.

The crude S-alkylsilyl hydrocarbonthioate-terminated or S-alkylstannyl hydrocarbonthioate-terminated organic polymer can optionally further purified by treatment with color absorbing particulates, such as activated carbon, or filtration.

One embodiment of the invention includes compositions comprising at least one S-alkylsilyl hydrocarbonthioate-terminated or S-alkylstannyl hydrocarbonthioate-terminated organic polymer and at least one other component. The at least one additional component of the composition can include sulfur compounds, activators, retarders and accelerators, processing additives such as oils, plasticizers, tackifying resins, silicas, other fillers, pigments, fatty acids, zinc oxide, waxes, antioxidants and antiozonants, peptizing agents, reinforcing materials such as, for example, carbon black, and so forth. Such additives can be selected based upon the intended use and on the sulfur vulcanizable material selected for use, and such selection is within the knowledge of one of skill in the art, as are the required amounts of such additives known to one of skill in the art.

A particulate filler may also be added to the compositions of the present invention, including siliceous fillers, carbon black, and so forth. The filler materials useful herein include, but are not limited to, metal oxides such as silica (pyrogenic and/or precipitated), titanium dioxide, aluminosilicate and alumina, clays and talc, carbon black, and so forth.

Particulate, precipitated silica is also sometimes used for such purpose, particularly when the silica is used in conjunction with a silane. In some cases, a combination of silica and carbon black is utilized for reinforcing fillers for various rubber products, including treads for tires. Alumina can be used either alone or in combination with silica. The term, alumina, can be described herein as aluminum oxide, or $Al_2O_3$. The fillers may be hydrated or in anhydrous form.

The composition should contain a sufficient amount of filler to contribute a reasonably high modulus and high resistance to tear. In one embodiment of the present invention, the combined weight of the filler may be as low as about 5 to about 120 parts per hundred parts rubber (phr). In another embodiment, the combined weight of the filler is from about 25 to about 85 phr and at least one precipitated silica can be utilized as a filler. Preferred silica may be characterized by having a BET surface area, as measured using nitrogen gas, in the range of about 40 to about 600 $m^2/g$. In another embodiment of the invention, the silica has a BET surface area in a range of about 50 to about 300 $m^2/g$. The BET method of measuring surface area is described in the *Journal of the American Chemical Society*, Volume 60, page 304 (1930). The silica typically may also be characterized by having a dibutylphthalate (DBP) absorption value in a range of about 100 to about 350 $m^2/g$, and more usually about 150 to about 300 $m^2/g$. Further, the silica, as well as the aforesaid alumina and aluminosilicate, may be expected to have a CTAB surface area in a range of about 100 to about 220 $m^2/g$. The CTAB surface area is the external surface area as evaluated by cetyl trimethylammonium bromide with a pH of about 9. The method is described in ASTM D 3849.

Mercury porosity surface area is the specific surface area determined by mercury porosimetry. Using this method, mercury is penetrated into the pores of the sample after a thermal treatment to remove volatiles. Set up conditions may be suitably described as using about a 100 mg sample; removing volatiles during about 2 hours at about 105° C. and ambient atmospheric pressure; ambient to about 2000 bars pressure measuring range. Such evaluation may be performed according to the method described in Winslow, Shapiro in ASTM bulletin, p.39 (1959) or according to DIN 66133. For such an evaluation, a CARLO-ERBA Porosimeter 2000 might be used. The average mercury porosity specific surface area for the silica should be in a range of about 100 to about 300 $m^2/g$.

In one embodiment, a suitable pore size distribution for the silica, alumina and aluminosilicate according to such mercury porosity evaluation is considered herein to be such that five percent or less of its pores have a diameter of less than about 10 nm, about 60 to about 90 percent of its pores have a diameter of about 10 to about 100 nm, about 10 to about 30 percent of its pores have a diameter at about 100 to about 1,000 nm, and about 5 to about 20 percent of its pores have a diameter of greater than about 1,000 nm.

In a second embodiment, the silica can be selected to have an average ultimate particle size, for example, in the range of about 10 to about 50 nm as determined by the electron microscope, although the silica particles may be even smaller, or possibly larger, in size. Various commercially available silicas may be considered for use in this invention such as, from PPG Industries under the HI-SIL trademark with designations HI-SIL 210, 243, etc.; silicas available from Rhone-Poulenc, with, for example, designation of ZEOSIL 1165MP; silicas available from Degussa with, for example, designations VN2 and VN3, etc. and silicas commercially available from Huber having, for example, a designation of HUBERSIL7 8745.

In still another embodiment of the invention, the compositions may utilize siliceous fillers such as silica, alumina and/or aluminosilicates in combination with carbon black reinforcing pigments. The compositions may comprise a filler mix of about 15 to about 95 weight percent of the siliceous filler, and about 5 to about 85 weight percent carbon black, wherein the carbon black has a CTAB value in a range of about 80 to about 150. More typically, it is desirable to use a weight ratio of siliceous fillers to carbon black of at least about 3/1 in one embodiment, and at least about 10/1 in another embodiment. Thus, the weight ratio may range from about 3/1 to about 30/1 for siliceous fillers to carbon black.

In another embodiment of the invention, the filler can be comprised of about 60 to about 95 weight percent of said silica, alumina and/or aluminosilicate and, correspondingly, about 40 to about 5 weight percent carbon black. The siliceous filler and carbon black may be pre-blended or blended together in the manufacture of the composition.

In yet another embodiment of the present invention, the compositions are prepared by mixing one or more of the silane coupling agents with the one or more S-alkylsilyl hydrocarbonthioate-terminated organic polymer or one or more S-alkylstannyl hydrocarbonthioate-terminated organic polymer before, during or after the compounding of the filler into the S-alkylsilyl hydrocarbonthioate-terminated organic polymers and/or S-alkylstannyl hydrocarbonthioate-terminated organic polymer.

Coupling agents can have a general formula (X):

$$A-T-Z \qquad (X)$$

wherein A represents a functional group capable of bonding physically and/or chemically with a group on the surface of the silica filler (e.g., surface silanol groups); T represents a hydrocarbon group linkage; and Z represents a functional group capable of bonding with the elastomer (e.g., via a sulfur-containing linkage). Such coupling agents include organosilanes, in particular polysulfurized alkoxysilanes, as disclosed in U.S. Pat. Nos. 3,873,489; 3,978,103; 3,997,581; 4,002,594; 5,580,919; 5,583,245; 5,663,396; 5,684,171; 5,684,172; 5,696,197 and 6,414,061 (these patents are each incorporated herein by reference, in its entirety) or polyorganosiloxanes bearing the Z and A functionalities mentioned above. Exemplary coupling agents include bis[3-(triethoxysilyl)propyl]disulfide, bis[3-(tri-ethoxysilyl)propyl]tetrasulfide and S-(3-triethoxysilylpropyl) thiooctanoate.

The total amount of silane coupling agent present in the resulting combination may be about 0.05 to about 25 parts by weight per hundred parts by weight of organic polymer (phr); and about 1 to about 10 phr in another embodiment.

In yet another embodiment, fillers can be used in quantities ranging from about 5 to about 100 phr, and still in another embodiment, fillers can be used in quantities ranging from about 25 to about 80 phr.

In practice, compositions typically are prepared by thermomechanically mixing rubber and various ingredients in a sequentially step-wise manner followed by shaping and curing the compounded rubber to form a vulcanized product. First, for the aforesaid mixing of the S-alkylsilyl hydrocarbonthioate-terminated organic polymer(s) and/or S-alkylstannyl hydrocarbonthioate-terminated organic polymer(s) and various ingredients, typically exclusive of sulfur and sulfur vulcanization accelerators (collectively, curing agents), the rubber(s) and various rubber compounding ingredients typically are blended in at least one, and often (in the case of silica filled low rolling resistance tires) two or more, preparatory thermomechanical mixing stage(s) in suitable mixers. Such preparatory mixing is referred to as non-productive mixing or non-productive mixing steps or stages. Such preparatory mixing usually is conducted at temperatures of about 140° C. to about 200° C., and for some compositions, about 150° C. to about 180° C.

Subsequent to such preparatory mix stages, in a final mixing stage, sometimes referred to as a productive mix stage, curing agents, and possibly one or more additional ingredients, are mixed with the rubber compound or composition, at lower temperatures of typically about 50° C. to about 130° C. in order to prevent or retard premature curing of the sulfur curable composition, sometimes referred to as scorching. The composition, also referred to as a rubber compound, typically is allowed to cool, optionally after or during a process intermediate mill mixing, between the aforesaid various mixing steps, for example, to a temperature of about 50° C. or lower. When it is desired to mold and to cure the composition, the composition can be placed into the appropriate mold at a temperature of preferably at least about 130° C. and up to about 200° C. which will typically cause the vulcanization of the composition by the S—S bond-containing compounds, such as for example, sulfide or compounds containing disulfide, trisulfide, tetrasulfide or polysulfide functional groups.

Thermomechanical mixing refers to the phenomenon whereby mixing causes the temperature of the composition t increase. Under high shear conditions in a rubber mixer, the shear forces and associated friction occurring as a result of mixing the composition, or some blend of the S-alkylsilyl hydrocarbonthioate-terminated organic polymers and/or S-alkylstannyl hydrocarbonthioate-terminated organic polymer and other components in the high shear mixer, the temperature autogeneously increases. Several chemical reactions may occur at various stages in the mixing and curing processes.

The first reaction can be a relatively fast reaction and is considered herein to take place between the filler and the silane coupling agent. Such reaction may occur at a relatively low temperature, such as for example, at about 120° C. The second reaction can be considered herein to be the reaction which takes place between the silane coupling agent and the S-alkylsilyl hydrocarbonthioate-terminated organic polymer and/or S-alkylstannyl hydrocarbonthioate-terminated organic polymer at a higher temperature. The second reaction can occur, for example, above about 140° C.

Sulfur may be used, for example, in the form of elemental sulfur, such as but not limited to $S_8$. A sulfur donor is considered herein as a sulfur containing compound which liberates free, or elemental sulfur, at a temperature in a range of about 140° C. to about 190° C. Such sulfur donors may be, for example, although are not limited to, polysulfide vulcanization accelerators and organosilane polysulfides with at least two connecting sulfur atoms in its polysulfide bridge.

In one embodiment of the invention, the composition can comprise about 100 parts by weight of at least one S-alkylsilyl hydrocarbonthioate-terminated organic polymer and/or S-alkylstannyl hydrocarbonthioate-terminated organic polymers and about 5 to 120 parts by weight, preferably about 25 to 80 parts by weight of at least one particulate filler per hundred parts by weight of the total weight S-alkylsilyl hydrocarbonthioate-terminated organic polymers and S-alkylstannyl hydrocarbonthioate-terminated organic polymers, up to about 5 parts by weight of a curing agent per 100 parts by weight of the total weight S-alkylsilyl hydrocarbonthioate-terminated organic polymers and S-alkylstannyl hydrocarbonthioate-terminated organic polymers, and about 0.05 to about 25 parts silane coupling agent per hundred parts of the total weight S-alkylsilyl hydrocarbonthioate-terminated organic polymers and S-alkylstannyl hydrocarbonthioate-terminated organic polymers.

In another embodiment of the present invention, the filler comprises from about 1 to about 85 weight percent carbon black based on the total weight of the filler and 0 to about 20 parts by weight of at least one silane coupling agent based on the total weight of the filler.

In still another embodiment, the composition is prepared by first blending S-alkylsilyl hydrocarbonthioate-terminated organic polymers and/or S-alkylstannyl hydrocarbonthioate-terminated organic polymers, filler and silane coupling agent, in a first thermomechanical mixing step to a temperature of about 140° C. to about 200° C. for about 2 to about 20 minutes. Optionally, the curing agent is then added in another thermomechanical mixing step at a temperature of about 50° C. and mixed for about 1 to about 30 minutes. The temperature is then heated again to a temperature from about 130° C. to about 200° C. and curing is accomplished in about 5 to about 60 minutes.

In another embodiment of the present invention, the process may also comprise the additional steps of preparing an assembly of a tire, vibrational pad, or other industrial or consumer good.

The curing, also referred to as vulcanization, may be conducted in the presence of additional sulfur vulcanizing agents. Examples of suitable sulfur vulcanizing agents include, for example elemental sulfur (free sulfur) or sulfur donating vulcanizing agents, for example, an amino disulfide, polymeric polysulfide or sulfur olefin adducts which are conventionally added in the final, productive, rubber composition mixing step. The sulfur vulcanizing agents, which are common in the art are used, or added in the productive mixing stage, in an amount ranging from about 0.4 to about 3 phr, or even, in some circumstances, up to about 8 phr, with a range of from about 1.5 to about 2.5 phr and all subranges therebetween in one embodiment from about 2 to about 2.5 phr and all subranges therebetween in another embodiment.

Vulcanization accelerators, i.e., additional sulfur donors, may be used herein. It is appreciated that may include the following examples, benzothiazole, alkyl thiuram disulfide, guanidine derivatives and thiocarbamates. Representative of such accelerators can be, but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methyl piperazine), dithiobis(N-beta-hydroxy ethyl piperazine) and dithiobis(dibenzyl amine). Other additional sulfur donors, may be, for example, thiuram and morpholine derivatives. Representative of such donors are, for example, but not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide, and disulfidecaprolactam.

Accelerators can be used to control the time and/or temperature required for vulcanization and to improve the properties of the vulcanizate. In one embodiment, a single accelerator system may be used, i.e., a primary accelerator. A primary accelerator(s) can be used in total amounts ranging from about 0.5 to about 4 and all subranges therebetween in one embodiment, and from about 0.8 to about 1.5 phr and all subranges therebetween in another embodiment. Combinations of a primary and a secondary accelerators can optionally be used with the secondary accelerator being used in smaller amounts (of about 0.05 to about 3 phr and all subranges therebetween) in order to activate and to improve the properties of the vulcanizate. Delayed action accelerators may also be used. Vulcanization retarders might also be used. Suitable types of accelerators are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator can be a guanidine, dithiocarbamate or thiuram compound.

Typical amounts of tackifier resins, if used, comprise about 0.5 to about 10 phr and all subranges therebetween, usually about 1 to about 5 phr and all subranges therebetween. Typical amounts of processing aids comprise about 1 to about 50 phr and all subranges therebetween. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants, comprise about 1 to about 5 phr and all subranges therebetween. Typical amounts of fatty acids, if used, which can include stearic acid, comprise about 0.5 to about 3 phr and all subranges therebetween. Typical amounts of zinc oxide comprise about 2 to about 5 phr. Typical amounts of waxes comprise about 1 to about 5 phr and all subranges therebetween. Often microcrystalline waxes are used. Typical amounts of peptizers comprise about 0.1 to about 1 phr and all subranges therebetween. Typical peptizers may be, for example, pentachlorothiophenol and dibenzamidodiphenyl disulfide.

The compositions of this invention can be used for various purposes. For example, it can be used for various tire compounds, vibration damping pads, cushioning pad, shock absorbing pads, gaskets, other goods weather stripping, and shoe soles and other goods. In one embodiment of the present invention, the rubber compositions described herein are particularly useful in tire treads, but may also be used for all other parts of the tire as well. The tires can be built, shaped, molded and cured by various methods which are known and will be readily apparent to those having skill in such art.

The invention can be better understood by reference to the following examples in which the parts and percentages are by weight unless otherwise indicated. The Examples are for illustration and should not be interpreted as limiting.

EXAMPLES

The following materials are used in the Examples to follow and/or are well suited for inclusion in a S-alkylsilyl hydrocarbonthioate-terminated and/or S-alkylstannyl hydrocarbonthioate-terminated organic polymer composition in accordance with the invention.

Example 1

Preparation of S-(4,4-diethoxy-4-sila-decyl) thiooctanoate

The S-(4,4-diethoxy-4-sila-decyl) thiooctanoate was prepared to illustrate the reaction steps in a model system. Into a 100-mL round bottom flask equipped with stir bar, heating mantle, temperature probe, condenser and nitrogen inlet was charge n-hexyl lithium (5 mL or a 2.3 M solution in hexane) and hexane (10 mL). The solution was heated to 50° C. and then 1,1-diethoxy-2-thia-1-sila-cyclopentane (2.23 grams) was added dropwise. The reaction mixture exotherm to a temperature of about 64° C. After the rise of the temperature stopped, octanoyl chloride (1.91 grams) was added to the intermediate, reaction product of n-hexyl lithium with 1,1-diethoxy-2-thia-1-sila-cyclopentane mixture. GC/MS analysis of the resulting reaction mixture identified the existence of S-(4,4-diethoxy-4-sila-decyl) thiooctanoate.

Example 2

Preparation of alpha-butyl, omega-[S-(3,3-diethoxy-3-silapropyl) thiooctanoate]-terminated co-polymer of styrene-butadiene In the following examples, glass vessels are dried and sealed with extracted septum liners and perforated crown caps under a positive $N_2$ purge are used. Butadiene solution (21.9% in hexane), styrene solution (33% in hexane), hexane, n-butyl lithium (1.60 M in hexane), 2,2-bis(2'-tetrahydrofuryl)-propane (1.60 M solution in hexane, which is stored over $CaH_2$), and butylated hydroxytoluene (BHT) solution in hexane are used.

The reagents are used without further purification, including N-(n-butyl)-aza-2,2-dimethoxysilacyclopentane and 2,2-dimethoxy-1-thia-2-silacyclopentane.

To a $N_2$-purged reactor, which is equipped with a stirrer, is charged 1.59 kilograms hexane, 0.41 kilograms styrene solution, and 2.49 kilograms butadiene solution. n-Butyllithium solution (3.30 mL) is added to the reactor, which is then followed by 2,2-bis(2'-tetrahydrofuryl)propane solution (1.1 mL). The reactor jacket is heated to 50° C. and the reaction undergoes an exothermic reaction. The reaction mixture is stirred for about 1 hour. The first intermediate polymer is obtained.

Into the reactor containing the first intermediate is added 2,2-dimethoxy-1-thia-2-silacyclopentane (5.3 mL of a 1.0 M solution in hexane) and is agitated at 50° C. for about 30 minutes to form the second intermediate.

Into the reactor containing the second intermediate is added octanoyl chloride (0.9 grams) and stirred for 1 hour. The lithium chloride is removed from the crude product to provide for alpha-butyl, omega-[S-(3,3-diethoxy-3-silapropyl)thiooctanoate]-terminated co-polymer of styrene-butadiene.

While the invention has been described with reference to certain embodiments, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. An organic polymer comprising an organic polymer fragment and at least one S-alkylsilyl hydrocarbonthioate group or at least one S-alkylstannyl hydrocarbonthioate group bonded to the backbone of the organic polymer fragment through a C—Si covalent bond.

2. The organic polymer of claim 1, wherein the backbone of the organic polymer fragment is derived from the anionic polymerization of monomers containing C—C unsaturation.

3. The organic polymer of claim 1, wherein the silicon atom of the S-alkylsilyl hydrocarbonthioate group or the tin atom of the S-alkylstannyl hydrocarbonthioate group is further bonded to two alkoxy groups, two hydrocarbon groups or to one alkoxy group and one hydrocarbon group.

4. The organic polymer of claim 1, wherein the organic polymer has the general formula (I):

$$[R^1C(=O)SR^2\text{-}M(OR^3)_a(R^4)_{2-a}\text{-}]_bG^1\text{-}[R^5]_{2-b} \quad (I)$$

wherein
each M is independently a silicon or tin atom;
each $R^1$ is independently a monovalent alkyl, cycloalkyl, alkenyl, aryl or aralkyl group having 1 to 24 carbon atoms;
each $R^2$ is independently a divalent alkyl group of from 2 to 6 carbon atoms;
each $R^3$ is independently a monovalent alkyl, cycloalkyl, alkenyl, aryl or aralkyl group having 1 to 12 carbon atoms, or a monovalent group having the structure —$R^6(OR^7)_c(OR^8)_dR^9$, where $R^6$ is a divalent alkyl group having from 2 to 6 carbon atoms, $R^7$ is ethylene, each $R^8$ is independently propylene or butylene, $R^9$ is a monovalent alkyl, cycloalkyl, alkenyl, aryl or aralkyl group having 1 to 20 carbon atoms or —(C=O)$R^4$, and the subscripts c and d are integers, wherein c is from 0 to 6 and d is from 0 to 6, with the proviso that c+d is from 1 to 10;
each $R^4$ is independently methyl or phenyl;
$R^5$ is a monovalent alkyl, cycloalkyl, alkenyl, aryl or aralkyl group having 1 to 24 carbon atoms;
$G^1$ is an organic polymer fragment having a backbone of carbon atoms covalently bonded together by C—C single bond, C—C double bond or a combination of C—C single bonds and C—C double bonds; and
the subscripts a and b are integers, where a is 0, 1 or 2 and b is 1 or 2.

5. The organic polymer of claim 4, wherein $G^1$ is an organic polymer fragment having the general formula (III):

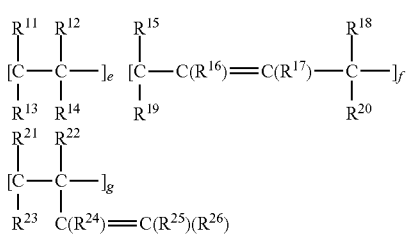

wherein
each $R^{11}$, $R^{12}$, $R^{13}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ and $R^{26}$ is independently a monovalent alkyl group having from 1 to 6 carbon atoms or hydrogen;
each $R^{14}$ is independently hydrogen or a monovalent alkyl of from 1 to 24 carbon atoms, cylcoalkyl of from 3 to 24 carbon atoms, alkenyl of from 1 to 24 carbon atoms, cycloalkenyl of from 5 to 24 carbon atoms, aralkyl of from 7 to 24 carbon atoms or aryl group of from 6 to 25 carbon atoms;
the subscripts e, f and g are integers, wherein e is equal to or greater than 0, f is equal to or greater than 0 and g is equal to or greater than 0, with the proviso that e+f+g is equal to or greater than 1.

6. The organic polymer of claim 5, wherein e is from 0 to 10,000.

7. The organic polymer of claim 5, wherein e is from 100 to 2,500.

8. The organic polymer of claim 5, wherein f is from 0 to 10,000.

9. The organic polymer of claim 7, wherein f is from, 100 to 2,500.

10. The organic polymer of claim 8, wherein g is from 0 to 10,000.

11. The organic polymer of claim 5, wherein g is from 100 to 2,500.

12. The organic polymer of claim 5, wherein e+f+g is from 1,000 to 5,000.

13. The organic polymer of claim 5, wherein each $R^{11}$, $R^{12}$, $R^{13}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ and $R^{26}$ is hydrogen, methyl or ethyl.

14. The organic polymer of claim 12, wherein $R^1$ is a monovalent straight chain alkyl group of from 2 to 14 carbon atoms.

15. The organic polymer of claim 5, wherein $R^1$ is a branched chain alkyl group of from 5 to 11 carbon atoms.

16. The organic polymer of claim 12, wherein $R^1$ is methyl, ethyl, propyl, pentyl, hexyl, heptyl, nonyl, unidecyl, octadecyl, dec-3-enyl, heptadec-5-enyl, heptadec-5,7-dienyl, heptadec-5,7,9-trienyl, 2-methylpentyl, 2-methylhexyl, 6-methylheptyl, 2-phenylmethyl, cyclohexyl, phenyl or tolyl.

17. The organic polymer of claim 5, wherein $R^2$ is a divalent straight chain alkyl group of from 1 to 6 carbon atoms or a divalent branched chain alkyl group of from 3 to 6 carbon atoms.

18. The organic polymer of claim 16, wherein $R^2$ is methyl, ethyl, propyl, 2-methylpropyl, 2,2-dimethylbutyl or hexyl.

19. The organic polymer of claim 5, wherein $R^3$ is a monovalent alkyl group of from 1 to 4 carbon atoms.

20. The organic polymer of claim 4, wherein the organic polymer has the general formula (IV):

$$R^1C(=O)SCH_2CH_2CH_2Si(OCH_2CH_3)_2G^1Si(OCH_2CH_3)_2CH_2CH_2CH_2SC(=O)R^1 \quad (IV)$$

where $R^1$ is a monovalent straight chain alkyl group having from 1 to 18 carbon atoms, and $G^1$ is an organic polymer fragment having a backbone of carbon atoms covalently bonded together by C—C single bond, C—C double bond or a combination of C—C single bonds and C—C double bonds.

21. The organic polymer of claim 1, wherein the number average molecular weight of the organic polymer is from about 2,000 to about 1,00,000 Daltons.

22. The organic polymer of claim 5, wherein the number average molecular weight of the organic polymer is from about 90,000 to about 150,000 Daltons.

23. A method of making an organic polymer, comprising:
reacting a chain of C—C unsaturated carbon atom monomers with an anionic initiator to form a first living anionic polymer intermediate,
reacting the living anionic polymer intermediate with a compound containing a 2-thia-1-sila cycloalkane ring or 2-thia-1-stanna cycloalkane ring to form a second intermediate containing at least one thiolate group; and
reacting the second intermediate with an acyl reactive group having the general formula (II):

$$R^1C(=O)X \quad (II)$$

wherein
$R^1$ is a monovalent alkyl, cycloalkyl, alkenyl, aryl or aralkyl group having 1 to 24 carbon atoms and X is chloride, bromide, iodide or a —$SR^{10}$, $R^{10}$ is a monovalent alkyl, cycloalkyl, alkenyl, aryl or aralkyl group having 1 to 12 carbon atoms to form the reaction product and a salt.

24. The method of claim 23, wherein the monomers are conjugated or unconjugated $C_4$-$C_{12}$ dienes, or $C_8$-$C_{20}$ vinyl aromatics.

25. The method of claim 23, wherein the monomers are selected from the group consisting of 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, styrene, α-methyl styrene, p-methyl styrene, vinyl toluene, and vinyl naphthalene and combinations thereof.

26. The method of claim 23, wherein the method comprises solution polymerization.

27. An S-alkylsilyl hydrocarbonthioate-terminated or S-alkylstannyl hydrocarbonthioate-terminated organic polymer.

28. An organic polymer composition comprising:
a S-alkylsilyl hydrocarbonthioate-terminated polymer or a S-alkylstannyl hydrocarbonthioate-terminated organic polymer or a combination thereof; and
a reinforcing material;
optionally a curative;
optionally a plasticizer; and
optionally one or more additives.

\* \* \* \* \*